United States Patent [19]

Olson et al.

[11] Patent Number: 4,718,755
[45] Date of Patent: Jan. 12, 1988

[54] MIRROR TURNING VANE

[75] Inventors: M. Eugene Olson; Lester L. Zehr, both of Fort Wayne, Ind.

[73] Assignee: Navistar International Transportation Corp., Chicago, Ill.

[21] Appl. No.: 616,641

[22] Filed: Jun. 4, 1984

[51] Int. Cl.$^4$ ............................................. G02B 00/00
[52] U.S. Cl. ..................................... 350/584; 350/582
[58] Field of Search ................................. 350/582, 584

[56] References Cited

U.S. PATENT DOCUMENTS 3,059,540 10/1962 Robinson .............................. 350/584
3,667,369 6/1972 Smith .................................... 350/584
4,550,988 11/1985 Harder et al. ........................ 350/584

FOREIGN PATENT DOCUMENTS 2511290 9/1975 Fed. Rep. of Germany .
1020576 2/1966 United Kingdom .

Primary Examiner—John K. Corbin
Assistant Examiner—Vincent J. Lemmo
Attorney, Agent, or Firm—F. David Aubuchon; Dennis K. Sullivan

[57] ABSTRACT

A turning vane is mounted on a mirror assembly for capturing, turning and ejecting an airstream across a mirror surface. The resulting air jet creates an air barrier protecting the whole mirror face from deposition of the airborne dirt, fluid, and other matter.

1 Claim, 6 Drawing Figures

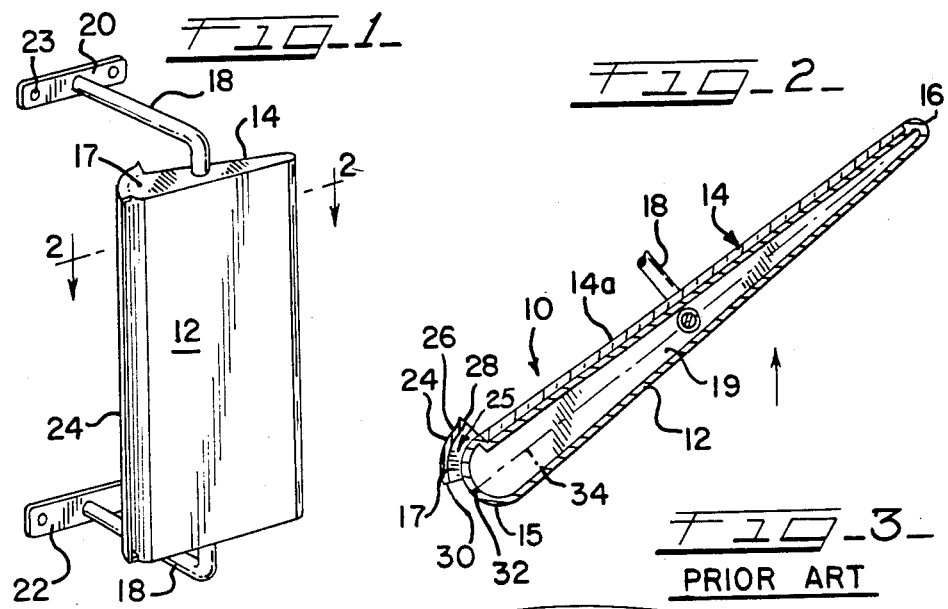
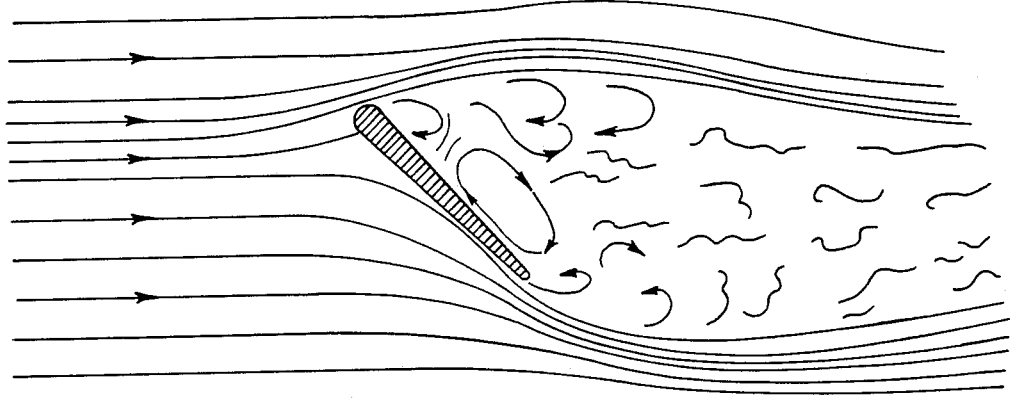
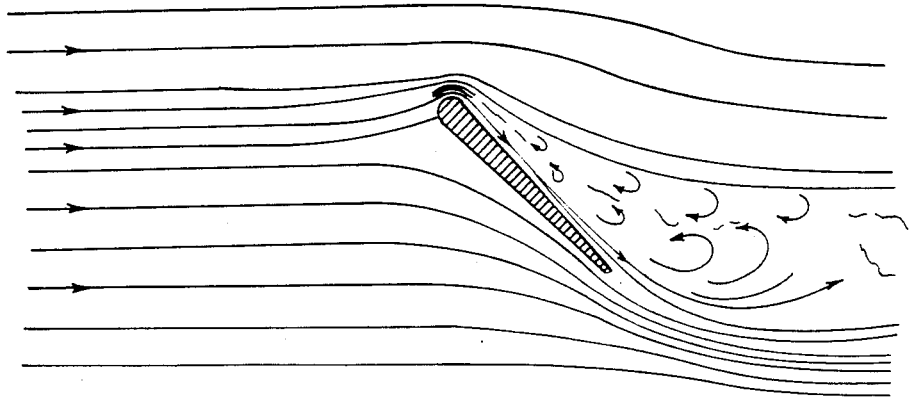

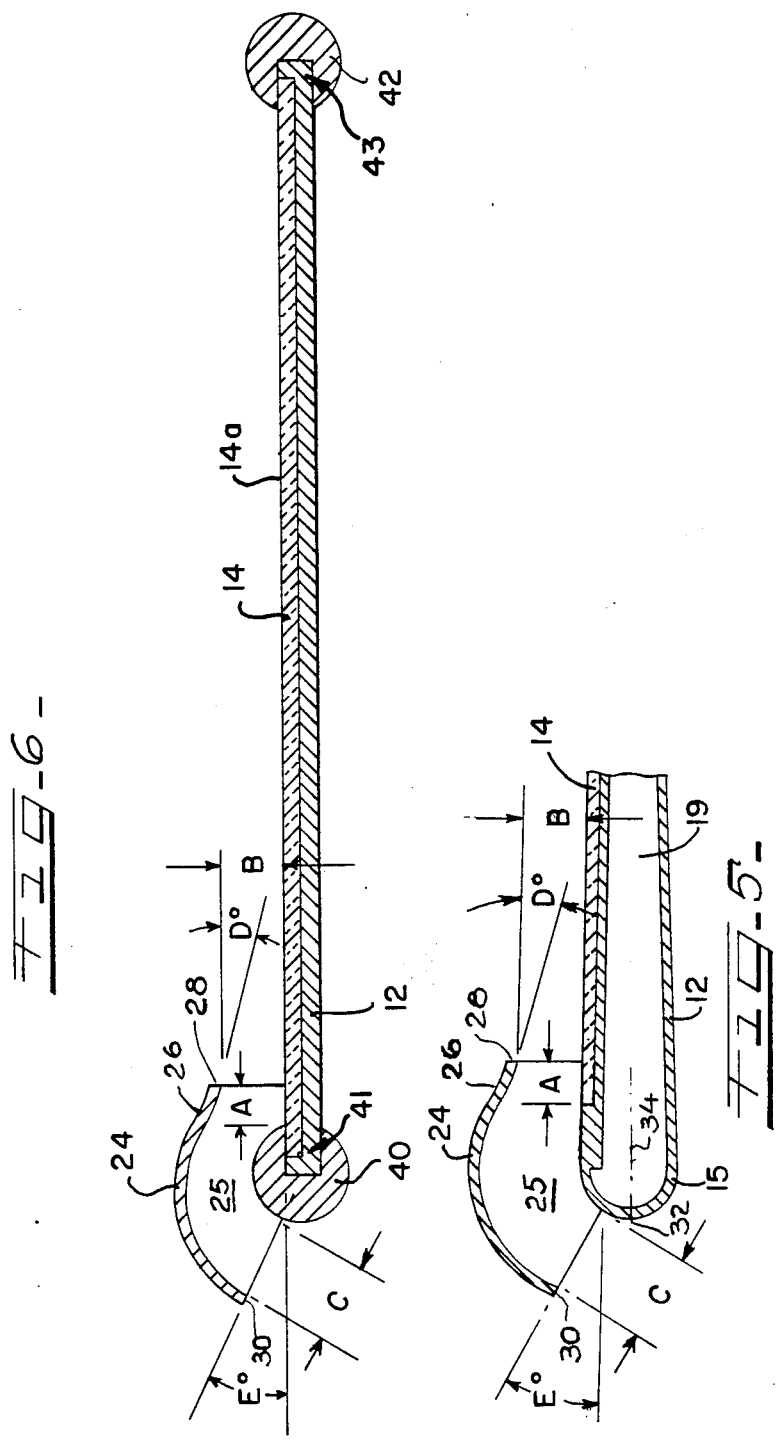

MIRROR TURNING VANE

BACKGROUND OF THE INVENTION

The invention pertains to mirror assemblies mounted on the motor vehicle and more particularly to a mirror assembly including a turning vane for creating an air barrier in front of a mirror surface.

Existing wind deflectors mounted on side view mirrors deflect an incoming airflow into a small portion of an upper part of the mirror. Therefore the limited effectiveness of such devices prevents the complete protection of an entire glass surface from a wide range of airborne dirt or fluid deposit caused by splash, spray and cross wind conditions.

The subject invention greatly improves an efficiency of the self-cleaning process of the mirror surface by a uniquely designed turning vane for capturing, guiding and ejecting incoming airflow, which blocks airborne fluid and dirt deposition on a full mirror surface.

SUMMARY OF THE INVENTION

According to the present invention, a mirror assembly comprises a turning vane which captures, guides and ejects an incoming airflow immediately downstream of the mirror assembly. An air jet exiting from the turning vane is drawn across the mirror surface. This creates an airflow barrier preventing a deposition of airborne matters on a mirror surface.

DESCRIPTION OF THE DRAWINGS

FIG. 1 is a perspective view of a subject mirror assembly;

FIG. 2 is a cross-sectional view thereof taken substantially along the lines 2—2 in FIG. 1;

FIG. 3 is a schematic view of an airflow pattern created by the mirror assembly without a turning vane;

FIG. 4 is a schematic view of an airflow pattern created by the mirror assembly with the turning vane;

FIG. 5 is a blown-up fragment of the mirror assembly shown in FIG. 2; and

FIG. 6 is a cross-sectional view of the mirror assembly with the turning vane in its second embodiment.

DESCRIPTION OF THE FIRST EMBODIMENT

Referring now to the drawings wherein reference characters designate like or corresponding parts throughout the several views, there is shown in FIGS. 1, 2 and 5 a mirror assembly 10 mounted on a body of a motor vehicle, such as a truck (not shown). The mirror assembly 10 comprises a front panel 12 facing an incoming airflow (indicated by an arrow in FIG. 2) and a mirror glass plate 14 disposed downstream of the airflow. The mirror surface is designated as 14a. The mirror plate 14 and the front panel 12 are interconnected by an inner round member 15 disposed closer to a motor vehicle body (not shown) and an outer round member 16. The curvature radius of the member 15 in cross-section exceeds the same of the member 16 in this embodiment. Flanges 17 cap the top and bottom portions of the mirror assembly 10. The mirror assembly 10 is supported by a mount rod or bail 18 passing through the space 19 between the mirror plate 14 and the panel 12. The attachment plates 20 and 22 unitary with the mount bail ends are secured to the vehicle body by bolts (not shown) passing through the holes 23 therein.

A turning vane 24 is coextensive with the round members 15 and 16 framing the mirror in opposition to each other and bordered by the flanges 17 normal thereto. Thus, the stationary channel 25 between the inner round member 15 and the vane 24 is set forth. The circular turning vane 24 has an inclined exit lip 26 compressing and guiding an air jet toward and across the mirror surface 14a. The lip 26 ends with an edge 28 and an air inlet begins with a vane front edge 30. The apex line 32 of the inner round member 15 is lying in a center longitudinal plane 34 of the assembly 10 and positioned upstream of the front edge 30. The apex line 32 constitutes a leading edge of the mirror assembly 10.

For a successful operation of the turning vane it is desirable that an exit space B between the exit lip edge 28 and mirror face 14a should be generally equal to or smaller than an inlet space C between the vane front edge 30 and round member 15. For example, if B is between 0.35 and 0.65 inch, then C should be between 0.4 and 0.75 inch. The overlap A of the vane lip 26 over the mirror 14 should be substantial, at least 0.2 inch or more, since wider overlap improves the vane performance. The lip angle D between the vane lip 26 and mirror plate 14 is a function of the dimensional correlation between A and B. As C should be larger than or at least equal to B, the channel 25 width should never be less than the exit space B and no more than the inlet space C. It is also important that the front edge 30, and hence inlet C, should be located downstream of the apex line 32 under an angle E. E is relatively independent of the above cited parameters and can be essentially within a 10°–35° range.

DESCRIPTION OF THE SECOND EMBODIMENT

As shown in FIG. 6 in the second embodiment of the mirror assembly 10, the mirror glass plate 14 is merged with the front panel 12. The inner round member 40 encompasses the inner end portions 41 of the mirror 14 and the front panel 12 and the outer round member 42 encloses the outer end portions 43 thereof. The round members 40 and 42 have essentially the same radius. The turning vane 24 is structurally the same as used in the first embodiment and variables A, B, C, D, E are subject to the same principles as discussed in the first embodiment. For instance, if B is within 0.35–0.65 inch, then C should be within 0.4–0.75 inch.

The difference between the airflow patterns resulting from an installation of a turning vane is illustrated in FIGS. 3 and 4. The turbulent wake downstream of the mirror shown in FIG. 3 is reduced substantially by the air jet ejected from the turning vane. The pressure differential between the upstream and downstream of the mirror assembly helps to draw the air jet across the mirror surface.

In both embodiments, the assembly generates a jet of air which completely sweeps the mirror face at road speeds above 10 miles per hour and at an angle range of 0° (plane of glass parallel to the airstream) to approximately 90° (perpendicular to the airstream).

As is evident from the aforegoing, the self-cleaning mirror assembly provides a clean mirror surface using an airflow coming under any angle thereto. This saves driver's time for cleaning the mirror, as one need not stop often therefor. Also, the assembly amplifies the vehicle safety features by providing a clearer view of the traffic under the adverse weather conditions. The structural simplicity and ease of installation of the mirror assembly increase the total beneficial effect thereof.

While two embodiments of the invention have been illustrated and described herein, various changes and modifications may be made therein without departing from the spirit of the invention as defined by the scope of the appended claims.

What is claimed is:

1. In a mirror assembly of the type extending outwardly from a motor vehicle with its mirror surface disposed generally downstream of the direction of forward travel of said vehicle, said mirror assembly having a frame including a vertical peripheral edge on the vehicle side thereof and a vertical turning vane attached to said frame and disposed adjacent said vertical peripheral edge and defining therewith an air passage having an entrance section generally transverse to said direction of travel and curved to redirect, without abrupt change in direction, downstream airflow generated by forward vehicle movement against said mirror surface, the improvement wherein said turning vane substantially overlaps said mirror surface such that the entire section of said air passage is defined between said turning vane and said mirror surface is unobstructed, and the cross sectional area of said exit section is smaller than the cross sectional area of said entrance section, said passage being characterized by the absence of abrupt changes in cross sectional area between said entrance section and said exit section.

* * * * *